D. H. CLIPPINGER.
TRAP.
APPLICATION FILED JULY 31, 1911.
1,031,984.
Patented July 9, 1912.
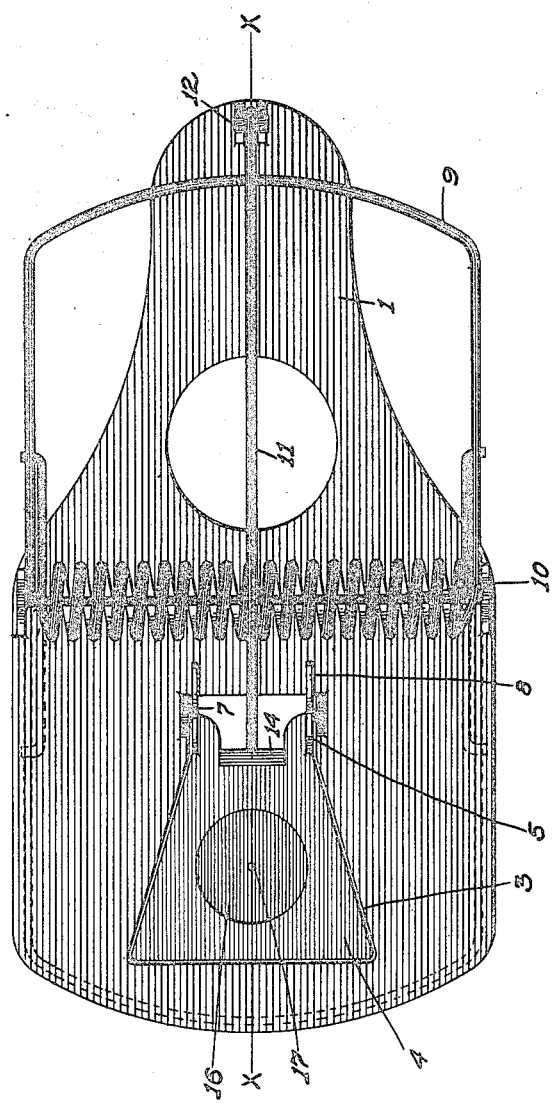
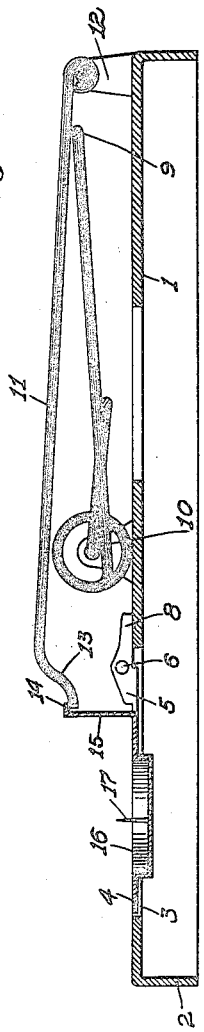
Witnesses
Inventor
D. H. Clippinger
By Percy D. Webster
Attorney

UNITED STATES PATENT OFFICE.

DAVID H. CLIPPINGER, OF PERKINS, CALIFORNIA.

TRAP.

1,031,984.

Specification of Letters Patent. Patented July 9, 1912.

Application filed July 31, 1911. Serial No. 641,396.

*To all whom it may concern:*

Be it known that I, DAVID H. CLIPPINGER, a citizen of the United States, residing at Perkins, in the county of Sacramento, State of California, have invented certain new and useful Improvements in Traps; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in traps and particularly to mouse or rat traps, the object of the invention being to produce a simple and absolutely reliable trap which will be so constructed as to allure the rodents without any tendency whatsoever to alarm them.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a top plan view of the complete trap. Fig. 2 is a sectional view of the same taken on a line x—x of Fig. 1.

Referring now more particularly to the characters of reference on the drawings, I first provide a platform member 1 held upward by side flanges or edges 2. Said platform 1 is provided with an opening 3 of any suitable shape, while 4 is a plate adapted to fit in said opening flush with the platform 1 and having projecting arms 5 mounted on pins 6 in lugs 7 on the platform 1, such arms 5 having stops 8 to fix the position of the plate 4 flush with the platform 1 when the trap is set.

The numeral 9 designates the spring jaw of the trap which catches the rodents, the same being suitably hinged on the platform 1 and actuated by any suitable spring structure 10.

The numeral 11 designates a holding pin which is hinged to the platform 1 at 12 and projects over the member 9 when the trap is set and has an end hook 13 which fits under a lug 14 on an upwardly projecting trigger member 15 on the plate 4 which normally holds the trap in operative position. The plate 4 is provided with a bait cup 16 having a pin 17 on which the bait may be fastened.

In practice the plate 4 being flush with the platform 1 does not tend to alarm the rodent and in searching for the bait held by the cup 16 he steps upon said platform, which operating on its hinged pin 6 causes the lug 14 to be disengaged from the hook 13 and the force of the spring 10 thus throws the member 9 over on to the rodent and catches him in the trap.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

A trap comprising the combination of a platform, a supporting flange disposed all around the outer under edge of said platform, said platform being provided with an opening cut in its top surface, a plate normally fitting into said opening and being normally flush with the top surface of said platform, projecting arms on said plate, pins in said arms, lugs on said platform spaced apart, said pins being turnable in said lugs, projecting stop members on said arms projecting back of said lugs and adapted to engage the top surface of said platform to maintain said plate normally flush with the top of said platform, a cup in said plate projecting below the top surface of said platform, a bait retaining means in said cup, a spring actuated jaw hinged on said platform, a pin hinged on said plate and adapted to hold said jaw open and a catch on said plate adapted to engage said pin, as described.

In testimony whereof I hereunto affix my signature in presence of two witnesses.

DAVID H. CLIPPINGER.

Witnesses:
JOSHUA P. WEBSTER,
FRANK H. CARTER.